(No Model.)

E. P. MANDIGO.
FEED WATER FILTER AND SEPARATOR.

No. 468,670. Patented Feb. 9, 1892.

WITNESSES:
Dom Twitchell
E. M. Clark

INVENTOR:
E. P. Mandigo
BY Munn & Co.
ATTORNEYS

UNITED STATES PATENT OFFICE.

ELWOOD P. MANDIGO, OF BROOKLYN, NEW YORK.

FEED-WATER FILTER AND SEPARATOR.

SPECIFICATION forming part of Letters Patent No. 468,670, dated February 9, 1892.

Application filed June 11, 1891. Serial No. 395,881. (No model.)

*To all whom it may concern:*

Be it known that I, ELWOOD P. MANDIGO, of the city of Brooklyn, in the county of Kings and State of New York, have invented a new and Improved Feed-Water Filter and Separator, of which the following is a full, clear, and exact description.

The object of the invention is to provide an apparatus for purifying feed-water, more especially the water of condensation from the condenser of a condensing-engine, by means of which the oil and other deleterious matter contained in the water will be effectively removed.

To these ends the invention consists in the novel construction and combination of parts, as hereinafter described, and defined in the claims.

Reference is to be had to the accompanying drawings, forming a part of this specification, in which similar letters of reference indicate corresponding parts in both the figures.

Figure 1:
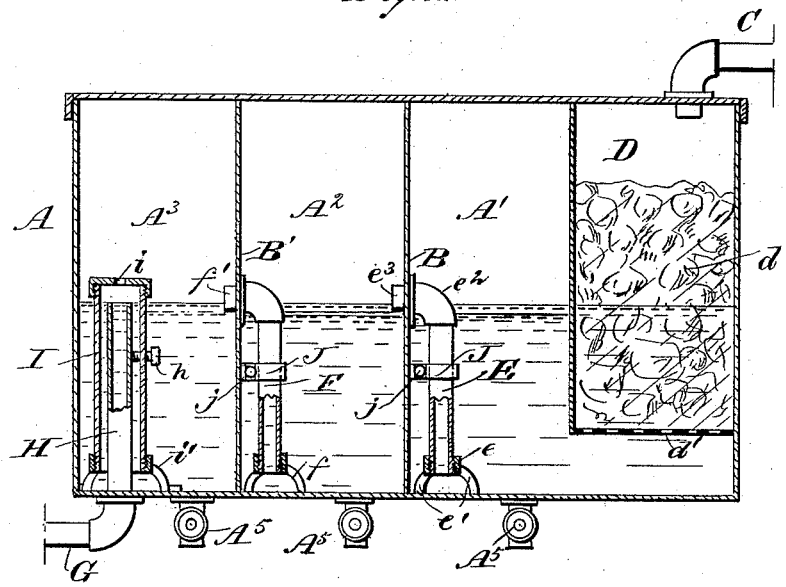
Figure 2:
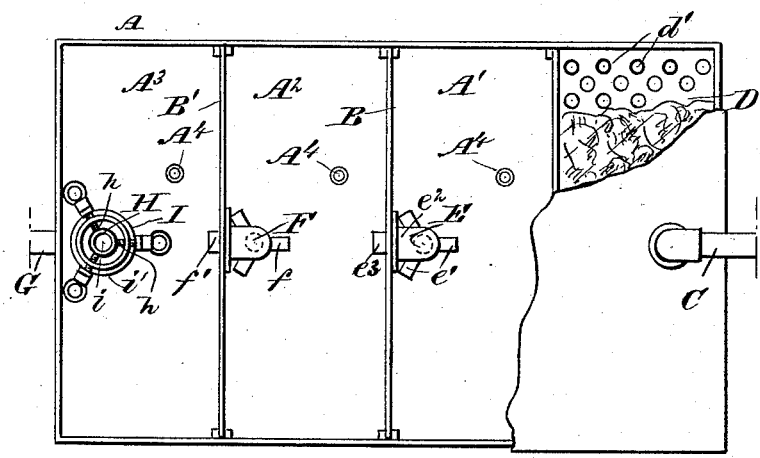

Figure 1 is a longitudinal vertical sectional view of a filter and separator constructed in accordance with my invention, and Fig. 2 is a plan view thereof with the top partly removed.

In constructing an apparatus in accordance with my invention a vessel A is provided of suitable dimensions and the same is divided into a series of compartments $A'$ $A^2$ $A^3$ by vertical partitions B $B'$, the said compartments in the present instance being three in number. An inlet-pipe C communicates with the first compartment through a filtering-chamber D, arranged therein, said inlet-pipe being in practice connected with the air-pump of a condenser for receiving the water of condensation.

The filtering-chamber D is to contain a suitable filtering material $d$ for removing any deleterious matter other than oil, and it will also retard more or less oil. In the bottom of the filter D a series of perforations $d'$ are produced, through which the water escapes into the chamber $A'$. In the chamber $A'$ is a vertical pipe E, which is supported a distance from the bottom of the chamber by a collar $e$, having legs $e'$, and at the upper end the pipe E is connected by an elbow $e^2$ with an outlet-nipple $e^3$, which extends through the partition B into the next chamber $A^2$ at the water-level. Thus the water will escape into the pipe E near the bottom of the chamber $A'$, the oil tending to find its way to the top thereof. In the chamber $A^2$ a second pipe F is erected and provided with a bottom inlet and supports $f$ and an outlet $f'$ to the chamber $A^3$ similar to the arrangement of the pipe E. Thus the oil that may enter the chamber $A^2$ from pipe E or the major portion thereof will remain on the surface of the water in the chamber $A^2$, while the water will escape from the bottom of said chamber to the top of the next chamber $A^3$.

In order to remove any oil that may yet remain in the water, the outlet-pipe G, leading to the boiler, is continued upward within the chamber $A^3$ or connected to a separate stand-pipe H therein, said pipe H being open at its upper end for the entrance of the water. Surrounding the pipe H is a case or pipe I, the closed upper end of which is provided with a vent-aperture $i$, and at the lower end the case I is supported above the bottom of chamber $A^3$ by the legged collar $i'$.

Any other suitable means of forming an inlet at the lower ends of the pipes E F I may be employed in practice.

In the bottom of each chamber $A'$ $A^2$ $A^3$ an outlet $A^4$ is provided, the drain-pipes of which are provided with cocks $A^5$, whereby the accumulated oil is removed, as occasion requires.

If desired, the pipes E F may be braced by the clamps J, which are supported from the partitions B $B'$ and encircle said pipes. A screw $j$ in each clamp serves to tighten the same on the pipes and thus securely maintain the latter in position; also in practice I prefer to steady the stand-pipe H by means of set-screws $h$, which are arranged radially in threaded apertures in the outer pipe or case I, so as to contact by their inner ends against the pipe H, as best shown in Fig. 2.

It will be seen that less oil will accompany the water as it progresses from chamber to chamber and by the time it reaches the outlet-pipe the oil will have been entirely separated therefrom and remain in the chamber A, the purified water passing to the boiler.

Having thus fully described my invention, I claim as new and desire to secure by Letters Patent—

1. In a separator for feed-water, a vessel having a series of compartments, and pipes establishing communication between the several compartments, the said pipes having openings at their lower ends near the bottom of one compartment and their outlets extending into the adjacent compartment at about the water-level, substantially as shown and described.

2. In a combined filter and separator for feed-water, the combination, with a vessel divided by partitions into a series of compartments and having an inlet and outlet, of a filter in communication with the inlet of said vessel and having outlet-apertures communicating with one of the compartments of the vessel, pipes establishing communication between adjoining compartments, the inlet of each pipe being near the bottom of one compartment and the outlet of the pipe being in the next compartment at about the water-level, a stand-pipe having an open upper end arranged in the last compartment to communicate with the final outlet, and a pipe surrounding said stand-pipe and having an open lower end and a closed upper end, substantially as described.

3. The combination, in a feed-water separator, of a vessel divided into a series of compartments, a series of pipes having each an inlet near the bottom of one compartment and an outlet near the water-level in the adjoining compartment, and an outlet-pipe in the last compartment, said outlet-pipe having an open upper end and being surrounded by a casing having an open lower end, substantially as described.

4. In a combined feed-water filter and separator, the combination, with a vessel A, divided into compartments by vertical partitions B B' and having an inlet C and an outlet G, of a filter D, to which said inlet leads, the filter having an apertured bottom $d'$ for the passage of the water to one of the compartments, a pipe E in said compartment, supported from the bottom thereof by the legged collar $e\ e'$, said pipe having its outlet end $e^2$ extending into the adjacent compartment at about the water-level, a pipe F, arranged in the second compartment similarly to the pipe E and having an outlet in the third compartment, a stand-pipe H in the said third compartment, having an open upper end and communicating with the outlet G, a case I, surrounding pipe H, the closed upper end of case I having a vent-aperture and the lower end of the pipe H being closed, and an outlet $A^4$ in each of the compartments for removing accumulated oil, substantially as described.

ELWOOD P. MANDIGO.

Witnesses:
A. F. DUGANNE,
JOHN H. KREY.